United States Patent
Dietl et al.

(10) Patent No.: US 12,180,413 B2
(45) Date of Patent: Dec. 31, 2024

(54) SOLID COOLANT CONCENTRATES AND PRODUCTION THEREOF

(71) Applicant: BASF SE, Ludwigshafen am Rhein (DE)

(72) Inventors: Harald Dietl, Ludwigshafen (DE); Uwe Nitzschke, Ludwigshafen (DE); Mario Sandor, Ludwigshafen (DE); Ruediger Schmitz, Weinheim (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/549,380

(22) PCT Filed: Mar. 4, 2022

(86) PCT No.: PCT/EP2022/055539
§ 371 (c)(1),
(2) Date: Sep. 7, 2023

(87) PCT Pub. No.: WO2022/189288
PCT Pub. Date: Sep. 15, 2022

(65) Prior Publication Data
US 2024/0052228 A1    Feb. 15, 2024

(30) Foreign Application Priority Data

Mar. 10, 2021   (EP) .................................... 21161682

(51) Int. Cl.
*C09K 5/20*    (2006.01)
*C09K 5/10*    (2006.01)
*C23F 11/12*    (2006.01)
*C23F 11/14*    (2006.01)
*C23F 11/18*    (2006.01)

(52) U.S. Cl.
CPC ............... *C09K 5/20* (2013.01); *C09K 5/10* (2013.01); *C23F 11/124* (2013.01); *C23F 11/182* (2013.01); *C23F 11/188* (2013.01); *C23F 11/149* (2013.01)

(58) Field of Classification Search
CPC ......................................................... C09K 5/20
See application file for complete search history.

(56) References Cited

U.S. PATENT DOCUMENTS

| | | |
|---|---|---|
| 5,643,493 A | 7/1997 | Connor et al. |
| 6,733,687 B1 | 5/2004 | Hudgens |
| 6,802,988 B1 | 10/2004 | Wenderoth et al. |
| 8,202,444 B2 | 6/2012 | Wenderoth et al. |
| 9,328,278 B2 | 5/2016 | Turcotte et al. |
| 2003/0122104 A1 | 7/2003 | Blakemore et al. |

FOREIGN PATENT DOCUMENTS

| | | | |
|---|---|---|---|
| DE | 1948794 A1 | 4/1971 | |
| DE | 3016623 | 11/1980 | |
| DE | 10163337 | 7/2003 | |
| EP | 1 230 317 | 2/2005 | |
| EP | 1 170 347 | 12/2009 | |
| EP | 2 428 542 | 3/2012 | |
| EP | 2 956 520 | 12/2015 | |
| EP | 4015596 A1 | 6/2022 | |
| GB | 2049650 A * | 12/1980 | ............... C09K 5/20 |
| WO | 2014/124826 | 8/2014 | |

OTHER PUBLICATIONS

European Search Report for EP Patent Application No. 21161682.6, Issued on Oct. 19, 2021, 5 pages.
International Search Report issued Jun. 21, 2022, in PCT/EP2022/055539, with English translation, 9 pages.
Written Opinion issued Jun. 21, 2022, in PCT/EP2022/055539, with English translation, 10 pages.
International Preliminary Report on Patentability dated Sep. 21, 2023, in PCT/EP2022/055539, with full English translation and partial machine translation, 20 pages.

* cited by examiner

*Primary Examiner* — Peter F Godenschwager
(74) *Attorney, Agent, or Firm* — Grüneberg and Myers PLLC

(57) ABSTRACT

The present invention describes novel coolant concentrates and the production and use thereof.

16 Claims, No Drawings

SOLID COOLANT CONCENTRATES AND PRODUCTION THEREOF

CROSS-REFERENCE TO RELATED APPLICATIONS

This application is the National Stage entry under § 371 of International Application No. PCT/EP2022/055539, filed on Mar. 4, 2022, and which claims the benefit of priority to European Patent Application No. 21161682.6, filed on Mar. 10, 2021. The content of each of these applications is hereby incorporated by reference in its entirety.

The present invention describes novel coolant concentrates and the production and use thereof.

Coolants for use in mobile or stationary internal combustion engines, but also in cooling circuits of electric vehicles or combinations of vehicles with electric motors and internal combustion engines, by the end user are generally liquid mixtures of water, glycols, corrosion inhibitors, bases and further constituents.

In order to reduce the volumes to be transported, what are sold are usually concentrates in which the water content is omitted or greatly reduced. The coolants are produced by the end user from the concentrates by adding water.

In order to further reduce the volumes to be transported, what are called superconcentrates are often produced centrally, in which not only the water content but additionally also the glycol content is omitted or greatly reduced. These superconcentrates are then used only regionally by formulators, by blending with glycols, to produce the concentrates.

In spite of these concentrates described, there is still a need for a further reduction in the volumes to be transported, in order to simplify logistics, safe transport capacity and reduce the effect of the transport on the environment.

On the market are highly concentrated or in some cases solid coolant additives, called supplemental cooling additives (SCAs), which are introduced by the end user into a coolant in use, and which are intended to replenish the corrosion inhibitors and bases that have been used during operation. By virtue of their concentrated form, they are incapable of supplementing water or glycols in the coolant.

Such SCAs are described, for example, in U.S. Pat. No. 5,643,493 or U.S. Pat. No. 6,733,687.

U.S. Pat. No. 5,643,493 describes such SCAs, and according to this the only corrosion inhibitors used are inorganic compounds such as phosphates, silicates, borates, nitrites, nitrates and molybdates. The only organic class of corrosion inhibitors is that of azoles.

There is no description of the organic carboxylic acids that are frequently used as corrosion inhibitors in present-day coolants.

U.S. Pat. No. 6,733,687 describes SCAs that can be used in solid, paste or liquid concentrate form and aromatic monocarboxylic acids or dicarboxylic acids, as well as inorganic constituents and azoles.

An obligatory constituent of the SCAs according to U.S. Pat. No. 6,733,687 is nitrites, especially sodium nitrite ($NaNO_2$) as an inhibitor against the corrosion of ferrous materials. But since nitrites have marked toxicity, the use thereof should be avoided.

Typically, nitrites are replaced as inhibitors against the corrosion of ferrous materials by aliphatic monocarboxylic acids; see U.S. Pat. No. 9,328,278.

In attempting to produce solid mixtures in analogy to U.S. Pat. No. 6,733,687 while replacing nitrites with aliphatic monocarboxylic acids, the person skilled in the art will find, however, that the presence of aliphatic monocarboxylic acids has the effect that the mixtures obtained are tacky and hence cannot be converted to a solid use form. Piles of solid mixtures would stick together and hence would not remain free-flowing, which would considerably complicate storage, transport and industrial use.

It was thus an object of the present invention to provide solid coolant concentrates that are easily convertible to a stable, solid use form and are nitrite-free, but at the same time have good inhibition of the corrosion of ferrous materials.

The object was achieved by nitrite-free solid compositions suitable for production of liquid antifreezes for coolant systems having anticorrosive action, comprising not more than 10%, preferably not more than 7.5% and more preferably not more than 5% by weight of water (A)

not more than 10%, preferably not more than 7.5% and more preferably not more than 5% by weight of alkylene glycol, alkylene glycol monoalkyl ethers and glycerol (B), as inhibitors (C):

(C1) at least one inorganic compound selected from the group consisting of silicates, borates, nitrates, molybdates and phosphates, (C2a) optionally benzoic acid as aromatic monocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 90% to 95% by weight, the proportion of aliphatic monocarboxylic acids in the overall composition does not exceed 1% by weight, the proportion of nitrites in the overall composition does not exceed 0.25% by weight and the sum total of all components is always 100% by weight.

The compositions of the invention can easily be produced in solid form, are of minor toxicological concern as a result of the absence of nitrites and can be processed easily to give superconcentrates, concentrates and coolants.

Moreover, they are the most concentrated form of the active components of coolants which is possible, such that only minimum amounts have to be moved when they are transported, in order to be able to produce superconcentrates, concentrates and coolants from the compositions of the invention in a decentralized manner. This constitutes a saving of energy or generally of $CO_2$ equivalents, and hence a reduction in the $CO_2$ balance.

Components (A) Water

The water used in the context of the present invention should be neutral with a pH of 7; this may, but need not necessarily, be demineralized or distilled water. In order to enable the use of hard water as well, the composition of the invention generally comprises at least one hard water stabilizer (see below).

(B) Alkylene glycol, alkylene glycol monoalkyl ether and glycerol

Component (B) has the main freezing point depression effect in the coolants. This comprises monomeric to tetrameric 1,2-ethylene glycols, 1,2-propylene glycols or, less commonly, 1,3-propylene glycols, preferably monomeric to trimeric 1,2-ethylene glycols or 1,2-propylene glycols, more preferably monomeric or dimeric 1,2-ethylene glycols, most preferably monomeric 1,2-ethylene glycol, and in each case the mixtures thereof.

The alkylene glycol monoalkyl ethers are the mono-$C_1$-$C_4$-alkyl ethers of the abovementioned alkylene glycols, preferably the monomethyl, -ethyl or -n-butyl ethers, more preferably the monomethyl or -n-butyl ethers, and most preferably the monomethyl ethers, In addition, glycerol or glycerol oligomers are possible components (B).

Preferred alkylene glycol components or derivatives are especially monoethylene glycol, diethylene glycol, triethylene glycol, tetraethylene glycol and mixtures thereof, but additionally also monopropylene glycol, dipropylene glycol and mixtures thereof, polyglycols, glycol ethers, for example monoethylene glycol monomethyl ether, diethylene glycol monomethyl ether, triethylene glycol monomethyl ether, tetraethylene glycol monomethyl ether, monoethylene glycol monoethyl ether, diethylene glycol monoethyl ether, triethylene glycol monoethyl ether, tetraethylene glycol monoethyl ether, monoethylene glycol mono-n-butyl ether, diethylene glycol mono-n-butyl ether, triethylene glycol mono-n-butyl ether and tetraethylene glycol mono-n-butyl ether, or glycerol, are each used alone or as mixtures thereof.

Particular preference is given to monoethylene glycol alone or mixtures of monoethylene glycol as main component, i.e. with a content in the mixture of more than 50% by weight, especially of more than 80% by weight, in particular of more than 95% by weight, with other alkylene glycols or derivatives of alkylene glycols.

Inhibitors (C)

The inhibitors (C) act as corrosion inhibitors against metal corrosion, for example of ferrous materials, aluminum, nonferrous metals or solder, The compositions of the invention comprise
(C1) at least one inorganic compound selected from the group consisting of silicates, borates, nitrates, molybdates and phosphates,
(C2a) optionally benzoic acid as aromatic monocarboxylic acid,
(C3) at least one organic dicarboxylic acid having 4 to 20 carbon atoms,
(C4) at least one azole, preferably at least one triazole compound.

Inorganic Inhibitors (C1)

The inorganic inhibitors (C1) are silicates, borates, nitrates, molybdates or phosphates, or mixtures thereof in the form of free acids or salts thereof, in particular the alkali metal salts thereof, more preferably the sodium or potassium salts thereof. The form (in protonated or salt form) in which they are used in the compositions, superconcentrates, concentrates or coolants depends on the respective $pK_a$ of the compound and of the composition and the pH of the respective medium which is established by the amount of base (D).

The inorganic silicates act predominantly as inhibitor of the corrosion of aluminum and are usually used in the form of alkali metal salts or, less commonly, in the form of magnesium, calcium or aluminum salts, preferably in the form of sodium or potassium salts.

The silicates are preferably selected from the group consisting of orthosilicates ($SO_4^{4-}$), metasilicates ($SiO_3^{2-}$), and pyrosilicates ($Si_2O_7^{6-}$), more preferably metasilicates ($SiO_3^{2-}$), even more preferably sodium metasilicate ($Na_2SiO_3$) or potassium metasilicate ($K_2SiO_3$), especially sodium metasilicate ($Na_2SiO_3$).

When the solid composition of the invention comprises at least one silicate, in a preferred embodiment, at least one silicophosphonate is included in addition to the silicate, as described in unpublished European patent application with application number 20213979.6 and filing date Dec. 15, 2020.

The silicophosphonate is preferably a compound of the general formula

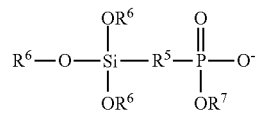

in which
$R^5$ is a divalent organic radical, preferably a 1,ω-alkylene group having 1 to 6, preferably 1 to 4, carbon atoms, more preferably methylene, 1,2-ethylene, 1,2-propylene, 1,3-propylene or 1,4butylene, even more preferably 1,2-ethylene or 1,3-propylene, and especially 1,2-ethylene,
$R^6$ is independently hydrogen, $C_1$- to $C_4$-alkyl or hydroxy-$C_2$- to $C_4$-alkyl, preferably hydrogen, methyl, ethyl, n-propyl, isopropyl, n-butyl, isobutyl, sec-butyl or tert-butyl, 2-hydroxyethyl or 2hydroxypropyl, more preferably hydrogen, methyl, ethyl or propyl,
and $R^7$ is $C_1$- to $C_4$-alkyl, preferably methyl, ethyl, n-propyl or n-butyl, more preferably methyl, ethyl or n-butyl, even more preferably methyl or ethyl and especially methyl.

The silicophosphonates may be used in the form of the free acid or as an alkali metal salt, preferably as the sodium or potassium salt and more preferably as the sodium salt.

The borates are preferably used in the form of sodium tetraborate (borax) or of potassium tetraborate, more preferably of sodium tetraborate.

The nitrates are used in the form of alkali metal or alkaline earth metal nitrates, preferably of sodium nitrate, potassium nitrate or magnesium nitrate, preferably of sodium nitrate or potassium nitrate, more preferably of sodium nitrate.

The phosphates are used as the free acid ($H_3PO_4$), as hydrogenphosphate, dihydrogenphosphate or phosphate, preferably as the sodium or potassium salt.

It is also conceivable to use the corresponding diphosphates, triphosphates or oligophosphates, but they are preferably used in the form of monomeric phosphates.

Preference is given to use as the free acid ($H_3PO_4$), disodium hydrogenphosphate or trisodium phosphate.

Components (C1) are preferably at least one compound selected from the group consisting of silicates, borates, nitrates or phosphates, more preferably at least one compound selected from the group consisting of silicates, nitrates or phosphates.

(C2a) Aromatic Monocarboxylic Acid

The optional aromatic monocarboxylic acid is preferably benzoic acid, which can be used as the free acid or more preferably in the form of an alkali metal salt thereof, most preferably as sodium benzoate.

In a preferred embodiment of the present invention, no aromatic monocarboxylic acid is present.

(C3) Organic Dicarboxylic Acid Having 4 to 20 Carbon Atoms

The organic dicarboxylic acids having 4 to 20 carbon atoms are linear or branched alkanedicarboxylic acids, preferably linear alkane- or alkenedicarboxylic acids, more preferably alkanedicarboxylic acids, more preferably having 5 to 14 and most preferably having 6 to 12 carbon atoms.

The dicarboxylic acids (C3) are preferably selected from the group consisting of succinic acid, maleic acid, furnaric acid, glutaric acid, adipic acid, pimelic acid (heptanedioic acid), azelaic acid (nonanedioic acid), sebacic acid (decanedloic acid), undecanedioic acid, dodecanedloic acid, and alkyl- and alkenylsuccinic acids and -glutaric acids such as 2-rnethylbutanedioic acid, 2ethyl-3-methylbutanedioic acid, 2-ethylpentanedioic acid, 2-dodecylbutanedioic acid, 2-dodecenylbutanedioic acid, 2-phenylbutanedioic acid, 2-(p-methylphenyl)butanedioic acid, 2,2-dirnethylbutanedioic acid, 2,3,4-trimethylpentanedioic acid, 2,2,3-trimethylpentanedioic acid, glutaconic acid (pent-2-enedioic acid), itaconic acid, hex-2-enedioic acid, hex-3-enedioic acid, 5methylhex-2-enedioic acid and 2,3-dimethylpent-2-enedioic acid.

Among these, preference is given to the dicarboxylic acids that have 6 to 12 carbon atoms, particular preference among these to the alkanedicarboxylic acids having 6 to 12 carbon atoms, very particular preference to the linear alkanedicarboxylic acids having 6 to 12 carbon atoms.

Especially preferred as dicarboxylic acids (D3) are adipic acid, sebacic acid, azelaic acid and dodecanedicarboxylic acid.

(C4) Azole Compound

In the context of this document, azole derivatives (C4) are understood to mean five-membered heterocyclic compounds having 2 or 3 heteroatoms from the group of nitrogen and sulfur which comprise no sulfur atoms or at most one sulfur atom incorporated in the ring and which may optionally bear an aromatic or saturated six-membered fusion.

These five-membered heterocyclic compounds (azole derivatives) typically comprise as heteroatoms two N atoms and no S atom, 3 N atoms and no S atom or one N atom and one S atom.

Preferred groups of the azole derivatives mentioned are fused imidazoles and fused 1,2,3-triazoles of the general formula

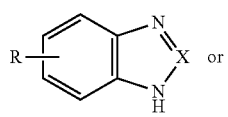
(III)

or

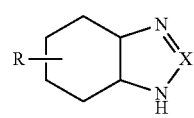
(IV)

in which the variable

R is hydrogen or a $C_1$- to $C_{10}$-alkyl radical, in particular methyl or ethyl, and the variable X is a nitrogen atom or the C—H moiety.

Typical and preferred examples of azole derivatives of the general formula (III) are benzimidazole (X=C—H, R=H), benzotriazole (X=N, R=H) and tolyltriazole (X=N, R=CH$_3$). A typical example of an azole derivative of the general formula (IV) is hydrogenated 1,2,3-tolyltriazole (X=N, R=CH$_3$).

A further preferred group of the azole derivatives mentioned is that of the benzothiazoles of the general formula (V)

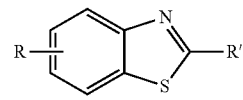

in which
the variable R is as defined above and
the variable R' is hydrogen, a $C_1$- to $C_{10}$-alkyl radical, in particular methyl or ethyl, or in particular a mercapto group (—SH). Conceivably, albeit less preferably, R' may also be a carboxyalkyl radical of formula —($C_mH_{2m}$)—COOR", wherein m is a number from 1 to 4 and R" is hydrogen or $C_1$- to $C_{10}$-alkyl, in particular methyl or ethyl, or $C_6$- to $C_{12}$-aryl. Examples of these are (2-benzothiazylthio)acetic acid, (2-benzothiazylthio)acetic esters, 3-(2- benzothiazylthio)propionic acid or 3-(2-benzothiazylthio)propionic esters. If these compounds are used in acid form, they are not among the carboxylic acids excluded in accordance with the invention. A typical example of an azole derivative of the general formula (V) is 2-mercaptobenzothiazole.

Also preferred are nonfused azole derivatives of the general formula (VI)

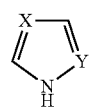
(VI)

in which the variables
X and Y are together two nitrogen atoms or
a nitrogen atom and a C—H moiety,
for example 1H-1,2,4-triazole (X=Y=N) or preferably imidazole (X=N, Y=C—H).

Very particularly preferred as azole derivatives for the present invention are benzimidazole, benzotriazole, tolyltriazole, hydrogenated tolyltriazole or mixtures thereof, in particular benzotriazole or tolyltriazole, especially tolyltriazole.

The azole derivatives mentioned are commercially available or are producible by common methods. Hydrogenated benzotriazoles such as hydrogenated tolyltriazole are likewise obtainable according to DE-A 1 948 794 and are also commercially available.

The azoles are preferably selected from the group consisting of benzotriazole, tolyltriazole, (2-benzothiazylthio) acetic acid, 3-(2-benzothiazylthio)propionic acid and 2-mercaptobenzothiazole.

(D) Inorganic Base

The pH of the antifreezes made by the end user is typically within the range from 4 to 11.5, preferably 5 to 10, especially 6 to 9.

In order to establish this pH, in the method of producing the coolants from a concentrated precursor, at least one inorganic base (D) is added at any stage. It is possible for the at least one inorganic base to be present in the composition of the invention, in the superconcentrate or in the concentrate, or to be added in the course of production of the superconcentrate from the composition of the invention by mixing with components (A) and/or (B), in the production of the concentrate from the superconcentrate by mixing with components (A) and/or (B), or in the production of the coolant from the concentrate by mixing with components (A) and/or (B).

Therefore, the compositions of the invention optionally comprise an amount of inorganic base which establishes this desired pH in the coolant in the case of appropriate dilution. For this purpose, the compositions of the invention preferably comprise alkali metal hydroxide, more preferably solid lithium hydroxide, sodium hydroxide or potassium hydroxide, optionally also in the form of aqueous lithium hydroxide, sodium hydroxide or potassium hydroxide solution.

Less preferred are carbonates or hydrogencarbonates of lithium, sodium or potassium.

Preferred alkali metals are sodium and potassium.

In a preferred embodiment, at least a portion of the inorganic base, preferably the entirety of the inorganic base required, is already present in the composition of the invention. This firstly has the advantage that the base need not be added at any later production stage and hence there is no risk of incorrect dosage; secondly, the acids added are thus in the form of their usually more readily crystallizing alkali metal salt form, which facilitates the formulation of the solid composition of the invention in solid form.

(E) Other Constituents Selected from the Group Consisting of Hard Water Stabilizers, Defoamers, Dyes and Bitter Substances As further customary auxiliaries, the composition of the invention may also comprise, in customary small amounts, defoamers (generally in amounts of from 0.003 to 0.008% by weight in the ready-diluted coolant) and, for reasons of hygiene and safety in the event that it is swallowed, bitter substances (for example of the denatonium benzoate type) and dyes.

In addition, the composition may comprise one or more hard water stabilizers based on polyacrylic acid, polymaleic acid, acrylic acid-maleic acid copolymers, polyvinylpyrrolidone, polyvinylimidazole, vinylpyrrolidone-vinylimidazole copolymers and/or copolymers of unsaturated carboxylic acids and olefins. The proportion in the composition is chosen such that, after appropriate dilution, the amount in the ready-diluted coolant is up to 1% by weight.

The invention rules out aliphatic monocarboxylic acids and nitrites as constituents of the compositions of the invention. The presence thereof is preferably only acceptable to such an extent that they are present as technical, or technically resultant, impurities in the other components, particularly in nitrates as component (C1) and dicarboxylic acids (C3).

Aliphatic Monocarboxylic Acids

The monocarboxylic acids that are explicitly excluded in the compositions of the invention are organic aliphatic alkane- or alkenecarboxylic acids. Assuming sufficient water solubility, these are frequently used in coolants as corrosion inhibitors to counter the corrosion of ferrous materials.

Typical monocarboxylic acids of this kind are pentanoic acid, 2,2-dimethylpropanoic acid, hexanoic acid, 2,2-dimethylbutanoic acid, octanoic acid, 2-ethylhexanoic acid, nonanoic acid, isononanoic acid, decanoic acid, undecanoic acid and dodecanoic acid, and isomer mixtures thereof, especially 2-ethylhexanoic acid and isononanoic acid isomer mixtures.

Monocarboxylic acids of this kind are liquid or have a low melting point, for example of not more than 50° C., such that Et is not possible to produce solid compositions with the free acids, and the resultant compositions do not stick, turn waxy and/or cake in the course of storage.

Since it cannot be ruled out that monocarboxylic acids of this kind can form by decarboxylation from the abovementioned dicarboxylic acids (C3) that are present in the compositions of the invention, the compositions of the invention are considered to be free of these monocarboxylic acids when the proportion of these monocarboxylic acids that are explicitly ruled out in accordance with the invention in the compositions of the invention does not exceed 1% by weight, for example 0.5% by weight, and is preferably not more than 0.3% by weight, more preferably not more than 0.2%, even more preferably not more than 0.1% and especially not more than 0.05% by weight. Specifically, no monocarboxylic acids are present.

However, it is a possible, albeit less preferred, embodiment of the present invention to use the aliphatic monocarboxylic acids in the form of their alkali metal salts, preferably in the form of their lithium, sodium or potassium salts, more preferably in the form of their sodium or potassium salts, rather than the free acid when the salts of the aliphatic monocarboxylic acids in question are solid or at least soapy at room temperature (20° C.). In that case, the solid compositions may comprise up to 15% by weight of the alkali metal salt of the aliphatic monocarboxylic acids, preferably up to 12.5% by weight, more preferably up to 10% by weight, even more preferably up to 7.5% by weight and in particular up to 5% by weight.

The superconcentrates obtained from such solid compositions by dilution with (A) and/or (B) may accordingly comprise up to 10% by weight of the alkali metal salt of the aliphatic monocarboxylic acids, preferably up to 7.5% by weight, more preferably up to 5% by weight, even more preferably up to 3% by weight and in particular up to 1% by weight.

The concentrates obtained from such solid compositions by dilution with (A) and/or (B) may accordingly comprise up to 5% by weight of the alkali metal salt of the aliphatic monocarboxylic acids, preferably up to 4% by weight, more preferably up to 3% by weight, even more preferably up to 2% by weight and in particular up to 1% by weight.

The coolants obtained from such solid compositions by dilution with (A) and/or (B) may accordingly comprise up to 3% by weight of the alkali metal salt of the aliphatic monocarboxylic acids, preferably up to 2.5% by weight, more preferably up to 2% by weight, even more preferably up to 1.5% by weight and in particular up to 1% by weight.

The amounts of the other components (A) to (E), by contrast, remain as described for the compositions that are obtained from the solid compositions that contain a low level of aliphatic monocarboxylic acids, if any.

Nitrites

The nitrites that are ruled out in the composition in accordance with the invention are all inorganic salts of nitrite ($NO_2^-$) and nitrous acid ($HNO_2$). Typically, nitrite is used in coolants in the form of sodium nitrite or potassium nitrite or is converted to these by the inorganic bases (D), such that these species in particular are ruled out.

Since it cannot be ruled out that, in the presence of nitrate as inhibitor (C1) in the compositions of the invention, nitrite can form by reduction, the compositions of the invention are considered to be nitrite-free when the proportion thereof in the compositions of the invention does not exceed 0.2% by weight, and is preferably not more than 0.15% by weight, more preferably not more than 0.1% by weight and most preferably not more than 0.05% by weight. Specifically, no nitrite is present.

Production

The compositions of the invention are produced by mixing components (A) to (E) in suitable apparatus until a homogeneous mixture is formed.

Suitable apparatus is ultrasound apparatus, high-pressure homogenizers, and mills, for example 2-, 3-, 4- or 5-roll mills, mini mills, Henschel mixers, agitated mills, Ang mills, gear mills, bead mills, attritors, colloid mills, ultrasonic homogenizers, Ultra-Turrax stirrers and ball mills, especially stirred ball mills. Also conceivable are kneaders having one or two mixing and needing shafts within the apparatus, in which axial transport through the apparatus can be effected by arrangement of conveying, kneading and/or mixing elements, for example disk elements, shafts, screws, blades, wipers or rotors.

A suitable duration for the mixing has been found to be, for example, 5 minutes to 10 hours, although a longer period is also conceivable. Preferably, a duration for the mixing is from 10 minutes to 4 hours.

Pressure and temperature conditions in the mixing operation are generally uncritical; for example standard pressure has been found to be suitable. Suitable temperatures have been found to be, for example, temperatures in the range from 10° C. to 100° C., preferably 20 to 80° C.

The homogeneous mixture is optionally, but preferably, sieved after mixing, for example in order to remove the balls after ball grinding, and the ground material is subsequently processed to shaped bodies, preferably pressed, pelletized or extruded.

The possible geometries of the shaped bodies are in principle not subject to any restrictions. Examples include pellets, for example disk-shaped pellets, pills, spheres, flakes, platelets, granules, extrudates, for example rod extrudates, honeycombs, meshes or hollow bodies.

The pressing and/or deforming can preferably be effected by means of a piston press or roll press or by compounding, pelletizing, tableting, extrusion, coextruding, granulating, or a combination of two or more of these methods.

Very particularly, pellets and/or tablets are produced.

It may be advantageous to provide the shaped bodies obtained with a coating after the formation, in order to prevent caking of the shaped bodies in the course of storage. Such a coating is made to be water-soluble in order that it dissolves in the later production of the superconcentrates, concentrates or coolants.

Production of the Concentrates

In the context of he present document, coolants, concentrates and superconcentrates are defined by their composition as follows:

Coolants:

Liquid antifreezes for cooling systems with anticorrosive action, comprising
  at least 40% by weight of water (A)
  at least 30% by weight of alkylene glycol, alkylene glycol monoalkyl ether and glycerol (B), as inhibitors (C):
  (C1) at least one inorganic compound selected from the group consisting of silicates, borates, nitrates, molybdates and phosphates,
  (C2a) optionally benzoic acid as aromatic monocarboxylic acid,
  (C3) at least one organic dicarboxylic acid having 4 to 20 carbon atoms,
  (C4) at least one azole, preferably at least one triazole compound,
  (D) optionally at least one inorganic base,
  (E) at least one other constituent selected from the group consisting of hard water stabilizers, defoamers, dyes and bitter substances,
with the proviso that
  the total proportion of the inhibitor components (C), inorganic base components (D) and other components (E), based on the overall composition, is up to 10%, preferably up to 7.5% and more preferably up to 5% by weight,
  the proportion of aliphatic monocarboxylic acids in the overall composition does not exceed 0.2% by weight,
  the proportion of nitrites in the overall composition does not exceed 0.05% by weight and
  the sum total of all components is always 100% by weight.

Concentrate

Liquid compositions for the preparation of antifreezes for coolant systems with anticorrosive action, comprising
  not more than 15%, preferably not more than 10% and more preferably not more than 5% by weight of water (A)
as inhibitors (C):
  (C1) at least one inorganic compound selected from the group consisting of silicates, borates, nitrates, molybdates and phosphates,
  (C2a) optionally benzoic acid as aromatic monocarboxylic acid,
  (C3) at least one organic dicarboxylic acid having 4 to 20 carbon atoms,
  (C4) at least one azole, preferably at least one triazole compound,
  (D) optionally at least one inorganic base,
  (E) at least one other constituent selected from the group consisting of hard water stabilizers, defoamers, dyes and bitter substances,
with the proviso that
  the total proportion of the inhibitor components (C), inorganic base components (D) and other components (E), based on the overall composition, is 0.01% to 10%, preferably 0.5% to 7,5% and more preferably 1% to 5% by weight,
  the proportion of aliphatic monocarboxylic acids in the overall composition exceeds 0.4% by weight,
  the proportion of nitrites in the overall composition does not exceed 0.1% by weight and
  the remainder to 100% by weight is at least one alkylene glycol, alkylene glycol monoalkyl ether or glycerol (B).

Superconcentrate

Liquid compositions for the preparation of antifreezes for coolant systems with anticorrosive action, comprising
  not more than 15%, preferably not more than 10% and more preferably not more than 5% by weight of water (A)
as inhibitors (C):
  (C1) at least one inorganic compound selected from the group consisting of silicates, borates, nitrates, molybdates and phosphates,
  (C2a) optionally benzoic acid as aromatic monocarboxylic acid,
  (C3) at least one organic dicarboxylic acid having 4 to 20 carbon atoms,
  (C4) at least one azole, preferably at least one triazole compound,
  (D) optionally at least one inorganic base,
  (E) at least one other constituent selected from the group consisting of hard water stabilizers, defoamers, dyes and bitter substances,
with the proviso that
  the total proportion of the inhibitor components (C), inorganic base components (D) and other components (E), based on the overall composition, is 0.05% to 30%, preferably 1% to 20% and more preferably 2% to 10% by weight, the proportion of aliphatic monocarboxylic acids in the overall composition does not exceed 0.6% by weight, the proportion of nitrites in the overall composition does not exceed 0.2% by weight and the remainder to 100% by weight is at least one alkylene glycol, alkylene glycol monoalkyl ether or glycerol (B).

The coolant is the specification of a composition for temperate climes, which may differ for extremely hot (higher water content) or extremely cold regions (higher content of component (B)).

The present invention provides a process for producing a superconcentrate comprising not more than 15%, preferably not more than 10% and more preferably not more than 5% by weight of water (A)

as inhibitors (C):
- (C1) at least one inorganic compound selected from the group consisting of silicates, borates, nitrates, molybdates and phosphates,
- (C2a) optionally benzoic acid as aromatic rnonocarboxylic acid,
- (C3) at least one organic dicarboxylic acid having 4 to 20 carbon atoms,
- (C4) at least one azole, preferably at least one triazole compound,
- (D) optionally at least one inorganic base,
- (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.05% to 30%, preferably 1% to 20% and more preferably 2% to 10% by weight, the proportion of aliphatic rnonocarboxylic acids in the overall composition does not exceed 0.6% by weight, the proportion of nitrites in the overall composition does not exceed 0.2% by weight and the remainder to 100% by weight is at least one alkylene glycol, alkylene glycol monoalkyl ether or glycerol (B), by admixing a solid composition of the invention with the appropriate amount of at least one alkylene glycol, alkylene glycol monoalkyl ether or glycerol (B).

The present invention further provides a process for producing a concentrate comprising not more than 15%, preferably not more than 10% and more preferably not more than 5% by weight of water (A)

as inhibitors (C):
- (C1) at least one inorganic compound selected from the group consisting of silicates, borates, nitrates, molybdates and phosphates,
- (C2a) optionally benzoic acid as aromatic monocarboxylic acid,
- (C3) at least one organic dicarboxylic acid having 4 to 20 carbon atoms,
- (C4) at least one azole, preferably at least one triazole compound,
- (D) optionally at least one inorganic base,
- (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.01% to 10%, preferably 0.5% to 7.5% and more preferably 1% to 5% by weight, the proportion of aliphatic monocarboxylic acids in the overall composition does not exceed 0.4% by weight, the proportion of nitrites in the overall composition does not exceed 0.1% by weight and the remainder to 100% by weight is at least one alkylene glycol, alkylene glycol monoalkyl ether or glycerol (B), by, in a first step, admixing a solid composition of the invention with the appropriate amount of at least one alkylene glycol, alkylene glycol monoalkyl ether or glycerol (B), hence obtaining a superconcentrate comprising not more than 15%, preferably not more than 10% and more preferably not more than 5% by weight of water (A)

as inhibitors (C):
- (C1) at least one inorganic compound selected from the group consisting of silicates, borates, nitrates, molybdates and phosphates,
- (C2a) optionally benzoic acid as aromatic monocarboxylic acid,
- (C3) at least one organic dicarboxylic acid having 4 to 20 carbon atoms,
- (C4) at least one azole, preferably at least one triazole compound,
- (D) optionally at least one inorganic base,
- (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.05% to 30%, preferably 1% to 20% and more preferably 2% to 10% by weight, the proportion of aliphatic monocarboxylic acids in the overall composition does not exceed 0.6% by weight, the proportion of nitrites in the overall composition does not exceed 0.2% by weight and the remainder to 100% by weight is at least one alkylene glycol, alkylene glycol monoalkyl ether or glycerol (B), and then, in a second step, the appropriate amount of water (A) is added thereto.

The present invention further provides a process for producing a concentrate comprising not more than 15%, preferably not more than 10% and more preferably not more than 5% by weight of water (A)

as inhibitors (C):
- (C1) at least one inorganic compound selected from the group consisting of silicates, borates, nitrates, molybdates and phosphates,
- (C2a) optionally benzoic acid as rnonocarboxylic acid,
- (C3) at least one organic dicarboxylic acid having 4 to 20 carbon atoms,
- (C4) at least one azole, preferably at least one triazole compound,
- (D) optionally at least one inorganic base,
- (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.01% to 10%, preferably 0.5% to 7.5% and more preferably 1% to 5% by weight, the proportion of aliphatic monocarboxylic acids in the overall composition does not exceed 0.4% by weight, the proportion of nitrites in the overall composition does not exceed 0.1% by weight and the remainder to 100% by weight is at least one alkylene glycol, alkylene glycol monoalkyl ether or glycerol (B), by adding the appropriate amount of at least one alkylene glycol, alkylene glycol monoalkyl ether or glycerol (B) and the appropriate amount of water (A) in any sequence to a solid composition of the invention.

The present invention further provides a process for producing a coolant comprising at least 40% by weight of water (A)

at least 30% by weight of alkylene glycol, alkylene glycol monoalkyl ether and glycerol (B), as inhibitors (C):

(C1) at least one inorganic compound selected from the group consisting of silicates, borates, nitrates, molybdates and phosphates, (C2a) optionally benzoic acid as aromatic monocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (0) and other components (E), based on the overall composition, is up to 10%, preferably up to 7.5% and more preferably up to 5% by weight, the proportion of aliphatic monocarboxylic acids in the overall composition does not exceed 0.2% by weight, the proportion of nitrites in the overall composition does not exceed 0.05% by weight and the sum total of all components is always 100% by weight, by, in a first step, admixing a solid composition of the invention with the appropriate amount of at least one alkylene glycol, alkylene glycol monoalkyl ether or glycerol (B), hence obtaining a superconcentrate comprising not more than 15%, preferably not ore than 10% and more preferably not more than 5% by weight of water (A)

as inhibitors (C):

(C1) at least one inorganic compound selected from the group consisting of silicates, borates, nitrates, molybdates and phosphates, (C2a) optionally benzoic acid as aromatic monocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.05% to 30%, preferably 1% to 20% and more preferably 2% to 10% by weight, the proportion of aliphatic monocarboxylic acids in the overall composition does not exceed 0.6% by weight, the proportion of nitrites in the overall composition does not exceed 0.2% by weight and the remainder to 100% by weight is at least one alkylene glycol, alkylene glycol monoalkyl ether or glycerol (B), and then, in a second step, the appropriate amount of water (A) is added thereto, hence obtaining a concentrate comprising not more than 15%, preferably not more than 10% and more preferably not more than 5% by weight of water (A)

as inhibitors (C):

(C1) at least one inorganic compound selected from the group consisting of silicates, borates, nitrates, molybdates and phosphates, (C2a) optionally benzoic acid as aromatic rnonocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.01% to 10%, preferably 0.5% to 7.5% and more preferably 1% to 5% by weight, the proportion of aliphatic rnonocarboxylic acids in the overall composition does not exceed 0.4% by weight, the proportion of nitrites in the overall composition does not exceed 0.1% by weight and the remainder to 100% by weight is at least one alkylene glycol, alkylene glycol monoalkyl ether or glycerol (B), and then, in a third step, the appropriate amount of water (A) is added thereto.

The present invention further provides a process for producing a coolant comprising at least 40% by weight of water (A)

at least 30% by weight of alkylene glycol, alkylene glycol monoalkyl ether and glycerol (B), as inhibitors (C):

(C1) at least one inorganic compound selected from the group consisting of silicates, borates, nitrates, molybdates and phosphates, (C2a) optionally benzoic acid as aromatic rnonocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (D) and other components (E), based on the overall composition, is up to 10%, preferably up to 7,5% and more preferably up to 5% by weight, the proportion of aliphatic monocarboxylic acids in the overall composition does not exceed 0.2% by weight, the proportion of nitrites in the overall composition does not exceed 0.05% by weight and the sum total of all components is always 100% by weight, by, in a first step, adding the appropriate amount of at least one alkylene glycol, alkylene glycol monoalkyl ether or glycerol (B) and the appropriate amount of water (A) in any sequence to a solid composition of the invention, hence obtaining a concentrate comprising not more than 15%, preferably not more than 10% and more preferably not more than 5% by weight of water (A)

as inhibitors (C):

(C1) at least one inorganic compound selected from the group consisting of silicates, borates, nitrates, molybdates and phosphates, (C2a) optionally benzoic acid as aromatic monocarboxylic acid, (C3) at least one organic dicarboxylic acid having 4 to 20 carbon atoms, (C4) at least one azole, preferably at least one triazole compound, (D) optionally at least one inorganic base, (E) at least one other constituent selected from the group consisting of hard water stabilizers, defoamers, dyes and bitter substances, with the proviso that the total proportion of the inhibitor components (C), inorganic base components (D) and other components (E), based on the overall composition, is 0.01% to 10%, preferably 0.5% to 7.5% and more preferably 1% to 5% by weight, the proportion of aliphatic monocarboxylic acids in the overall composition does not exceed 0.4% by weight, the proportion of nitrites in the overall composition does not exceed 0.1% by weight and the remainder to 100% by weight is at least one alkylene glycol, alkylene glycol monoalkyl ether or glycerol (B), and then, in a second step. the appropriate amount of water (A) is added thereto.

The mixing and dissolution of the composition of the invention with alkylene glycol, alkylene glycol monoalkyl ether or glycerol (B) and/or water (A) is generally effected by introduction of energy via shear energy. This can be effected, for example, in dynamic mixing apparatus, i.e. by mixing by stirrer or by pumped circulation (natural circulation or forced circulation) or pumped circulation with static mixing units such as static mixers or nozzles in the pumped circuit, by static mixing apparatus such as static mixers, nozzles, baffles or T pieces in the feed to the mixing vessel, or by dynamic mixing apparatus such as mixing pumps or stirred tanks.

Preference is given here to adding the solid composition of the invention in a constant stream or in one or more portions to an initial charge of the liquid, i.e. (A) and/or (B).

The mixing temperature is generally from 10 to 80° C., preferably from 15 to 70° C. and more preferably from 20 to 60° C. It is of course possible to conduct the mixing at a higher or lower temperature as well, provided that the components do not break down under the conditions chosen. However, this generally does not bring any benefits.

As set out above, it is possible, in the production of the coolant from the solid composition of the invention, to meter in the inorganic base (D) or a portion thereof in any step via the dilution to give the superconcentrate or concentrate, in order to adjust the desired pH in the finished coolant, provided that the solid composition of the invention does not yet contain the full amount of (D).

It is an advantage of the present invention that the solid compositions of the invention are produced centrally, and so only relatively small amounts have to be transported, and these are then blended regionally by formulators with components (B) to give superconcentrates or with components (A) and (B) to give concentrates.

This thus constitutes a reduction in the amounts transported since alkylene glycol, alkylene glycol monoalkyl ether and glycerol (B) are typically widely available and hence can easily be procured regionally.

The present invention thus further provides a method of reducing the emissions associated with transport of the product, for example nitrogen oxide and sulfur oxide emissions and especially carbon dioxide emissions, determined preferably as the carbon footprint or as a life cycle assessment, more preferably according to DIN EN ISO 14021, DIN EN ISO 14067, here in particular the 2019-02 edition, DIN EN ISO 14044, here in particular the 2006+A1:2018 edition, and/or DIN EN ISO 14040, here in particular the 2009-11 edition, by producing a solid composition of the invention at a first site and thence transporting it to a second site where the solid composition of the invention is used to produce a superconcentrate and/or concentrate by mixing with alkylene glycol, alkylene glycol monoalkyl ether and glycerol (B).

The basis for determination of the life cycle assessment is preferably DIN EN ISO 14040, here in particular the 2009-11 edition, and/or DIN EN ISO 14044, here in particular the 2006+A1:2018 edition.

The basis for determination of the carbon footprint here is preferably DIN EN ISO 14067, here in particular the 2019-02 edition.

The present invention further provides a method of reducing emissions, especially carbon dioxide emissions, determined preferably as the carbon footprint or life cycle assessment, more preferably according to DIN EN ISO 14021, DIN EN ISO 14067, here in particular the 2019-02 edition, DIN EN ISO 14044, here in particular the 2006+A1:2018 edition, and/or DIN EN ISO 14040, here in particular the 2009-11 edition, by producing a solid composition of the invention at a first site and thence transporting it to a second site where the solid composition of the invention is used to produce a superconcentrate and/or concentrate by mixing with alkylene glycol, alkylene glycol monoalkyl ether and glycerol (B), and this concentrate is sold to the end user, who uses the concentrate to produce a coolant at a third site by blending with water.

It is an advantage of the solid compositions of the invention that these can be used to produce superconcentrates and concentrates which can in turn be used for production of coolants.

By virtue of the smaller amounts to be transported, this achieves a reduction in emissions, particularly in $CO_2$ emissions, determined, for example, by the carbon footprint or life cycle assessment or according to DIN EN ISO 14021, DIN EN ISO 14067, here in particular the 2019-02 edition, DIN EN ISO 14044, here in particular the 2006 +A1:2018 edition and/or DIN EN ISO 14040, here in particular the 2009-11 edition.

A further advantage of the solid compositions of the invention is that they can be used to produce coolants having good inhibition of corrosion of ferrous materials, even though they avoid both nitrite and free aliphatic monocarboxylic acids, unless they are present for technical reasons. As a result of the avoidance of the usually liquid or low-melting aliphatic monocarboxylic acids, the solid compositions of the invention are storage-stable.

EXAMPLES

Formulations 1 to 3 of the active ingredients of coolants with aliphatic carboxylic acids were produced as a comparison, as opposed to which inventive formulations 4 to 6 were then produced, in which the constituents were each kept the same, but the proportions of the aliphatic carboxylic acids were replaced by dicarboxylic acids. Thus, the following pairs of formulations were comparable with one another: 1 vs. 4, 2 vs. 5 and 3 vs. 6.

Moreover, the tablets made from the formulations of the invention have a yield point which is about 0.5 $N/m^2$ higher, which shows the improved storability thereof (low caking in the course of storage).

Corrosion Examples

In order to show that coolants obtained from the solid coolant concentrates of the invention have comparably good corrosion-inhibiting action as compared with conventional nitrite-containing and monocarboxylic acid-containing coolants, corrosion experiments according to DIN 51360, Part 2 (July 1981) were carried out.

For this purpose, 20% and 40% by volume aqueous solutions of the respective concentrates were produced. In that case, the concentrates consisted of 90% by weight of monoethylene glycol and 10% by weight of the respective constituents from table 1.

The material used was dry GG 25 gray iron turnings according to DIN 1691 with a turning size of 3 to 6 mm.

TABLE 1

[figures in % by weight]

| Formulation | 1 (comp) | 2 (comp) | 3 (comp) | 4 | 5 | 6 |
|---|---|---|---|---|---|---|
| Benzotriazole, % | 1.55 | | | 1.55 | | |
| Sebacic acid, % | 17.71 | 43.08 | 40.85 | 47.96 | 51.70 | 49.00 |
| Borax, % | 11.51 | | | 11.51 | | |
| Dodecanedioic acid, % | 0.77 | | | 0.77 | | |
| Tolyltriazole, % | | 2.16 | 2.04 | | 2.16 | 2.04 |
| 2-Ethylhexanoic acid, % | 30.25 | | | 0 | | |
| Isononanoic acid, % | | 8.62 | 8.15 | | 0 | 0 |
| 2-Benzothiazolyl-thioacetic acid, % | | 2.15 | 2.04 | | 2.15 | 2.04 |
| Sodium molybdate dihydrate, % | | 2.87 | 4.89 | | 2.87 | 4.89 |
| Water, % | 2.096 | 1.62 | | 2.096 | 1.622 | |
| Monoethylene glycol, % | 2.513 | 1.95 | | 2.513 | 1.945 | |
| Silicophosphonate, % | 1.046 | 0.81 | | 1.046 | 0.809 | |
| Sodium metasilicate pentahydrate, % | 2.514 | 1.95 | | 2.514 | 1.945 | |
| NaOH, % | 15.96 | | | 15.96 | | |
| KOH, % | 0.67 | 28.33 | 31.15 | 0.67 | 28.33 | 31.15 |
| Hard water stabilizer, % | 0.45 | 0.216 | 0.20 | 0.45 | 0.216 | 0.204 |
| Monoethylene glycol, % | 8.81 | 4.095 | 3.87 | 8.81 | 4.095 | 3.867 |
| Sodium nitrate, % | 4.16 | | | 4.16 | | |
| Phosphoric acid 85%, % | | 2.15 | 6.80 | | 2.15 | 6.80 |

The silicophosphonate used is the compound according to table 1, footnote [3] of unpublished European patent application with application number 20213979.6 and filing date Dec. 15, 2020.

These formulations were used to press a tablet in a tableting press with a fitted manometer. The pressure was increased continuously here up to the yield point (constant pressure). In addition, the tableted compact was assessed visually and for its properties on removal from the compression mold.

TABLE 2

| Formulation | Condition | Pressure, $N/m^2$ | Removal from compression mold |
|---|---|---|---|
| 1 (comp) | crystalline, amorphous regions | 10.4 | highly tacky |
| 2 (comp) | crystalline, amorphous regions | 11.1 | slightly tacky |
| 3 (comp) | crystalline, amorphous regions | 10.8 | tacky |
| 4 | crystalline | 10.9 | nontacky |
| 5 | crystalline | 11.5 | nontacky |
| 6 | crystalline | 11.5 | nontacky |

It can be seen that the tablets made from the formulations of the invention crystalline compacts can be made, which are easily removable from the compression mold.

The corrosion results were assessed by visual assessment according to the following criteria over a five-grade assessment scale:

| Corrosion level | Meaning | Description |
|---|---|---|
| 0 | no corrosion | unchanged |
| 1 | traces of corrosion | not more than 3 signs of corrosion, none of which has a diameter of more than 1 mm |
| 2 | slight corrosion | not more than 1% of the surface discolored, but more or greater signs of corrosion than for corrosion level 1 |
| 3 | moderate corrosion | more than 1% but not more than 5% of the surface discolored |
| 4 | severe corrosion | more than 5% of the surface discolored |

TABLE 3

| Coolant based on | Concentration | Corrosion level |
|---|---|---|
| Formulation 1 (comp.) | 20 | 3 |
| Formulation 4 | 20 | 2 |
| Formulation 4 + 0.25% by weight of NaNO$_2$ | 20 | 2 |

In a concentration of 40% by volume, all coolants showed a corrosion level of 0 (zero).

TABLE 4

| Coolant based on | Concentration | Corrosion level |
|---|---|---|
| Formulation 2 (comp.) | 20 | 4 |
| Formulation 5 | 20 | 4 |
| Formulation 5 + 0.25% by weight of NaNO$_2$ | 20 | 3 |

In a concentration of 40% by volume, all coolants showed a corrosion level of 0 (zero).

TABLE 5

| Coolant based on | Concentration | Corrosion level |
|---|---|---|
| Formulation 3 (comp.) | 20 | 3 |
| Formulation 6 | 20 | 3 |
| Formulation 6 + 0.25% by weight of NaNO$_2$ | 20 | 2 |

In a concentration of 40% by volume, all coolants showed a corrosion level of 0 (zero).

It can be seen from the results from tables 3 to 5 that, in order to achieve comparable protection from corrosion on ferrous materials, nitrite and aliphatic monocarboxylic acid can be replaced by the compositions of the invention. Variance by one corrosion level was assumed here to be comparable within the scope of measurement accuracy.

The invention claimed is:

1. A process for producing a concentrate comprising not more than 15% by weight of water (A),
as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
with the proviso that
a total proportion of the inhibitor components (C), inorganic base components (D), and other components (E), based on the overall composition, is 0.01% to 10% by weight,
a proportion of aliphatic monocarboxylic acids in the overall composition does not exceed 0.4% by weight,
a proportion of nitrites in the overall composition does not exceed 0.1% by weight, and
the remainder to 100% by weight is at least one alkylene glycol, alkylene glycol monoalkyl ether, or glycerol (B),
the process comprising:
admixing:
not more than 10% by weight of water (A), not more than 10% by weight of alkylene glycol, alkylene glycol monoalkyl ethers, and glycerol (B),
as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
to form a solid composition,
with the proviso that
a total proportion of the inhibitor components (C), inorganic base components (D), and other components (E), based on the overall composition, is 90% to 95% by weight,
a proportion of aliphatic monocarboxylic acids in the overall composition does not exceed 1% by weight,
a proportion of nitrites in the overall composition does not exceed 0.25% by weight, and
a sum total of all components is always 100% by weight,
admixing the solid composition with an appropriate amount of the at least one alkylene glycol, alkylene glycol monoalkyl ether, or glycerol (B), hence obtaining a superconcentrate comprising
not more than 15% by weight of water (A), as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
with the proviso that
the total proportion of the inhibitor components (C), inorganic base components (D), and other components (E), based on the overall composition, is 0.05% to 30% by weight,
the proportion of aliphatic monocarboxylic acids in the overall composition does not exceed 0.6% by weight,
the proportion of nitrites in the overall composition does not exceed 0.2% by weight, and
the remainder to 100% by weight is at least one alkylene glycol, alkylene glycol monoalkyl ether, or glycerol (B),
and then, adding an appropriate amount of water (A), or alkylene glycol, alkylene glycol monoalkyl ether and glycerol (B), or both (A) and (B) thereto.

2. The process according to claim 1, wherein component (B) is monoethylene glycol.

3. The process according to claim 1, wherein component (C1) is a compound selected from the group consisting of silicates, borates, nitrates, and phosphates.

4. The process according to claim 1, wherein no aromatic monocarboxylic acid is present.

5. The process according to claim 1, wherein compound (C3) is a linear alkanedicarboxylic acid having 6 to 12 carbon atoms.

6. The process according to claim 1, wherein compound (C3) is selected from the group consisting of succinic acid, maleic acid, fumaric acid, glutaric acid, adipic acid, pimelic acid (heptanedioic acid), azelaic acid (nonanedioic acid), sebacic acid (decanedioic acid), undecanedioic acid, dodecanedioic acid, alkyl-and alkenylsuccinic acids and -glutaric acids, 2-methylbutanedioic acid, 2-ethyl-3-methylbutanedioic acid, 2-ethylpentanedioic acid, 2-dodecylbutanedioic acid, 2-dodecenylbutanedioic acid, 2-phenylbutanedioic acid, 2-(p-methylphenyl) butanedioic acid, 2,2-dimethylbutanedioic acid, 2,3,4-trimethylpentanedioic acid, 2,2,3-trimethylpentanedioic acid, glutaconic acid (pent-2-enedioic acid), itaconic acid, hex-2-enedioic acid, hex-3-enedioic acid, 5-methylhex-2-enedioic acid, and 2,3-dimethylpent-2-enedioic acid.

7. The process according to claim 1, wherein compound (C4) is selected from the group consisting of benzotriazole, tolyltriazole, (2-benzothiazylthio) acetic acid, 3-(2-benzothiazylthio) propionic acid, and 2-mercaptobenzothiazole.

8. The process according to claim 1, wherein forming the solid composition comprises:
mixing components (A) to (E) in a suitable apparatus over a period of 5 minutes to 10 hours at 10 to 100° C., until a homogeneous mixture is formed,
optionally, sieving the homogeneous mixture, and
subsequently, processing to give shaped bodies.

9. The process for producing the concentrate according to claim 1, which is a superconcentrate, comprising
not more than 15% by weight of water (A), as inhibitors (C):
(C1) at least one inorganic compound selected from the group consisting of silicates, borates, nitrates, molybdates, and phosphates,
(C2a) optionally, benzoic acid as aromatic monocarboxylic acid,
(C3) at least one organic dicarboxylic acid having 4 to 20 carbon atoms,
(C4) at least one azole,
(D) optionally, at least one inorganic base,
(E) at least one other constituent selected from the group consisting of hard water stabilizers, defoamers, dyes, and bitter substances,
with the proviso that
a total proportion of the inhibitor components (C), inorganic base components (D), and other components (E), based on the overall composition, is 0.05% to 30% by weight,
a proportion of aliphatic monocarboxylic acids in the overall composition does not exceed 0.6% by weight,
a proportion of nitrites in the overall composition does not exceed 0.2% by weight, and
the remainder to 100% by weight is at least one alkylene glycol, alkylene glycol monoalkyl ether, or glycerol (B),
the process comprising:
admixing the solid composition
with an appropriate amount of the at least one alkylene glycol, alkylene glycol monoalkyl ether, or glycerol (B).

10. The process according to claim 1, the process comprising:
initially charging component (A) and/or (B),
adding the solid composition, and
mixing by energy input by shear energy.

11. The process according to claim 1, wherein the composition comprises not more than 5% by weight of the water (A).

12. The process according to claim 1, wherein the composition comprises not more than 5% by weight of the alkylene glycol, alkylene glycol monoalkyl ethers, and glycerol (B).

13. The process according to claim 1, wherein the at least one azole (C4) is at least one triazole compound.

14. A process for producing a concentrate comprising not more than 15% by weight of water (A),
as inhibitors (C):
(C1) at least one inorganic compound selected from the group consisting of silicates, borates, nitrates, molybdates, and phosphates,
(C2a) optionally, benzoic acid as aromatic monocarboxylic acid,
(C3) at least one organic dicarboxylic acid having 4 to 20 carbon atoms,
(C4) at least one azole,
(D) optionally, at least one inorganic base,
(E) at least one other constituent selected from the group consisting of hard water stabilizers, defoamers, dyes, and bitter substances,
with the proviso that
a total proportion of the inhibitor components (C), inorganic base components (D), and other components (E), based on the overall composition, is 0.01% to 10% by weight,
a proportion of aliphatic monocarboxylic acids in the overall composition does not exceed 0.4% by weight,
a proportion of nitrites in the overall composition does not exceed 0.1% by weight, and
the remainder to 100% by weight is at least one alkylene glycol, alkylene glycol monoalkyl ether, or glycerol (B),
the process comprising:
forming a solid composition,
adding an appropriate amount of the at least one alkylene glycol, alkylene glycol monoalkyl ether, or glycerol (B) and an appropriate amount of water (A) in any sequence to the solid composition, wherein the solid composition is formed by admixing:
not more than 10% by weight of water (A),
not more than 10% by weight of alkylene glycol, alkylene glycol monoalkyl ethers, and glycerol (B),
as inhibitors (C):
(C1) at least one inorganic compound selected from the group consisting of silicates, borates, nitrates, molybdates, and phosphates,
(C2a) optionally, benzoic acid as aromatic monocarboxylic acid,
(C3) at least one organic dicarboxylic acid having 4 to 20 carbon atoms,
(C4) at least one azole,
(D) optionally, at least one inorganic base, (E) at least one other constituent selected from the group consisting of hard water stabilizers, defoamers, dyes, and bitter substances,
with the proviso that
a total proportion of the inhibitor components (C), inorganic base components (D), and other components (E), based on the overall composition, is 90% to 95% by weight,
a proportion of aliphatic monocarboxylic acids in the overall composition does not exceed 1% by weight,
a proportion of nitrites in the overall composition does not exceed 0.25% by weight, and
a sum total of all components is always 100% by weight.

15. A process for producing a coolant comprising at least 40% by weight of water (A),
at least 30% by weight of alkylene glycol, alkylene glycol monoalkyl ether, and glycerol (B),
as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
with the proviso that
a total proportion of the inhibitor components (C), inorganic base components (D), and other components (E), based on the overall composition, is up to 10% by weight,
a proportion of aliphatic monocarboxylic acids in the overall composition does not exceed 0.2% by weight,
a proportion of nitrites in the overall composition does not exceed 0.05% by weight, and
a sum total of all components is always 100% by weight,
the process comprising:
admixing
not more than 10% by weight of water (A),
not more than 10% by weight of alkylene glycol, alkylene glycol monoalkyl ethers, and glycerol (B),
as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
to form a solid composition,
with the proviso that
a total proportion of the inhibitor components (C), inorganic base components (D), and other components (E), based on the overall composition, is 90% to 95% by weight,
a proportion of aliphatic monocarboxylic acids in the overall composition does not exceed 1% by weight,
a proportion of nitrites in the overall composition does not exceed 0.25% by weight, and
a sum total of all components is always 100% by weight,
mixing the solid composition with an appropriate amount of at least one alkylene glycol, alkylene glycol monoalkyl ether, or glycerol (B), hence obtaining a super-concentrate comprising
not more than 15% by weight of water (A), as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
with the proviso that
the total proportion of the inhibitor components (C), inorganic base components (D), and other components (E), based on the overall composition, is 0.05% to 30% by weight,
the proportion of aliphatic monocarboxylic acids in the overall composition does not exceed 0.6% by weight,
the proportion of nitrites in the overall composition does not exceed 0.2% by weight, and
the remainder to 100% by weight is at least one alkylene glycol, alkylene glycol monoalkyl ether, or glycerol (B),
and then,
adding an appropriate amount of water (A), or alkylene glycol, alkylene glycol monoalkyl ether and glycerol (B), or both (A) and (B) thereto, hence obtaining a concentrate comprising
not more than 15% by weight of water (A), as inhibitors (C):
  (C1) at least one inorganic compound selected from the group consisting of silicates, borates, nitrates, molybdates, and phosphates,
  (C2a) optionally, benzoic acid as aromatic monocarboxylic acid,
  (C3) at least one organic dicarboxylic acid having 4 to 20 carbon atoms,
  (C4) at least one azole,
(D) optionally, at least one inorganic base,
(E) at least one other constituent selected from the group consisting of hard water stabilizers, defoamers, dyes, and bitter substances,
with the proviso that
the total proportion of the inhibitor components (C), inorganic base components (D), and other components (E), based on the overall composition, is 0.01% to 10% by weight,
the proportion of aliphatic monocarboxylic acids in the overall composition does not exceed 0.4% by weight,
the proportion of nitrites in the overall composition does not exceed 0.1% by weight, and
the remainder to 100% by weight is at least one alkylene glycol, alkylene glycol monoalkyl ether, or glycerol (B),
and then,
adding an appropriate amount of water (A) thereto, hence obtaining a coolant.

16. The process for producing a coolant according to claim 15, comprising
- at least 40% by weight of water (A),
- at least 30% by weight of alkylene glycol, alkylene glycol monoalkyl ether, and glycerol (B),
- as inhibitors (C):
  - (C1) at least one inorganic compound selected from the group consisting of silicates, borates, nitrates, molybdates, and phosphates,
  - (C2a) optionally, benzoic acid as aromatic monocarboxylic acid,
  - (C3) at least one organic dicarboxylic acid having 4 to 20 carbon atoms,
  - (C4) at least one azole,
- (D) optionally, at least one inorganic base,
- (E) at least one other constituent selected from the group consisting of hard water stabilizers, defoamers, dyes, and bitter substances, with the proviso that
- a total proportion of the inhibitor components (C), inorganic base components (D), and other components (E), based on the overall composition, is up to 10% by weight,
- a proportion of aliphatic monocarboxylic acids in the overall composition does not exceed 0.2% by weight,
- a proportion of nitrites in the overall composition does not exceed 0.05% by weight, and
- a sum total of all components is always 100% by weight, the process comprising:
adding an appropriate amount of at least one alkylene glycol, alkylene glycol monoalkyl ether, or glycerol (B) and an appropriate amount of water (A) in any sequence to the solid composition, hence obtaining a concentrate comprising
- not more than 15% by weight of water (A), as inhibitors (C):
  - (C1) at least one inorganic compound selected from the group consisting of silicates, borates, nitrates, molybdates, and phosphates,
  - (C2a) optionally, benzoic acid as aromatic monocarboxylic acid,
  - (C3) at least one organic dicarboxylic acid having 4 to 20 carbon atoms,
  - (C4) at least one azole,
- (D) optionally, at least one inorganic base,
- (E) at least one other constituent selected from the group consisting of hard water stabilizers, defoamers, dyes, and bitter substances, with the proviso that
- the total proportion of the inhibitor components (C), inorganic base components (D), and other components (E), based on the overall composition, is 0.01% to 10% by weight,
- the proportion of aliphatic monocarboxylic acids in the overall composition does not exceed 0.4% by weight,
- the proportion of nitrites in the overall composition does not exceed 0.1% by weight, and
- the remainder to 100% by weight is at least one alkylene glycol, alkylene glycol monoalkyl ether, or glycerol (B), and then,
adding an appropriate amount of water (A) thereto.

* * * * *